US005151694A

United States Patent [19]

Yamasaki

[11] Patent Number: 5,151,694

[45] Date of Patent: Sep. 29, 1992

[54] PAGING RECEIVER CAPABLE OF PREVENTING UNAUTHORIZED ACCESS TO MESSAGE MEANT THEREFOR

[75] Inventor: Koji Yamasaki, Tokyo, Japan

[73] Assignee: NEC Corporation, Tokyo, Japan

[21] Appl. No.: 374,020

[22] Filed: Jun. 30, 1989

[30] Foreign Application Priority Data

Jun. 30, 1988 [GB] United Kingdom ............. 63-164340

[51] Int. Cl.[5] ............................................ H04Q 7/00

[52] U.S. Cl. .......................... 340/825.44; 340/825.31

[58] Field of Search ...................... 340/825.44, 825.48, 340/825.3, 825.31, 825.34, 311.1; 235/380, 382; 379/56, 57, 62, 95

[56] References Cited

U.S. PATENT DOCUMENTS 4,297,569 10/1981 Flies .................................. 235/443
4,378,551 3/1983 Drapac ............................ 340/311.1
4,449,126 5/1984 Pekker ........................... 340/825.32
4,536,761 8/1985 Tsunoda et al. .............. 340/325.44
4,593,155 6/1986 Hawkins .............................. 379/62
4,639,726 1/1987 Ichikawa et al. ............. 340/825.44
4,677,434 6/1987 Fascenda ........................ 340/825.31
4,717,816 1/1988 Raymond et al. ............ 340/825.31
4,779,091 10/1988 Oyagi et al. .................... 340/825.44
4,870,403 9/1989 Mori et al. ..................... 340/825.44
4,916,144 4/1990 Gombrich ...................... 340/825.44

FOREIGN PATENT DOCUMENTS 0039130 2/1989 Japan ............................. 340/825.34

*Primary Examiner*—Donald J. Yusko
*Assistant Examiner*—Edwin C. Holloway, III
*Attorney, Agent, or Firm*—Sughrue, Mion, Zinn, Macpeak & Seas

[57] ABSTRACT

A paging receiver comprises an ID memory storing an ID number assigned to the receiver. If the ID number stored in the ID memory is coincident with an ID number stored in an ID card which is to be attached to the receiver, a received or stored message is displayed. If they are not coincident with each other, the received or stored message is prevented from being displayed. Thus, unauthorized access to the message can be prevented.

26 Claims, 4 Drawing Sheets

PAGING RECEIVER CAPABLE OF PREVENTING UNAUTHORIZED ACCESS TO MESSAGE MEANT THEREFOR

BACKGROUND OF THE INVENTION

The present invention relates to a paging receiver with a message display and, more particularly, to a paging receiver having a means which prevents loss of messages stored therein.

A conventional paging receiver receives a message following a paging number and stored the received message into a memory thereof. To prevent the stored message from being erased, the receiver has a means for supplying power to the memory irrespective of the position of a power switch. References are made to U.S. Pat. No. 4,768,031 issued to Mori and Umetsu on Aug. 30, 1988 and U.S. Pat. No. 4,779,091 to Oyagi and Mori on Oct. 18, 1988 both patents being assigned to the present assignee.

The stored message is read out and displayed by simply depressing a message read-out button. Thus, if an unauthorized person obtains the receiver, he/she easily reads out and knows the stored message which may include important and secret information.

SUMMARY OF THE INVENTION

An object of the present invention is, therefore, to provide a paging receiver capable of preventing unauthorized access to messages meant for the receiver.

Another object of the present invention is to provide a paging receiver in which a message can only be displayed using an authorized identification (ID) card.

According to the present invention, there is provided a paging receiver having an ID memory which stores an ID number assigned to the receiver. If an ID number stored in an ID card is identical with the ID number stored in the ID memory, a message is displayed on a display unit of the receiver. If they are not identical, the message is prevented from being displayed. Thus, unauthorized access to the message can be prevented.

BRIEF DESCRIPTION OF THE DRAWINGS

The above and other objects, features and advantages will become more apparent from the following description referring to the accompanying drawings, in which.

DETAILED DESCRIPTION OF THE PREFERRED EMBODIMENTS

Figure 1:
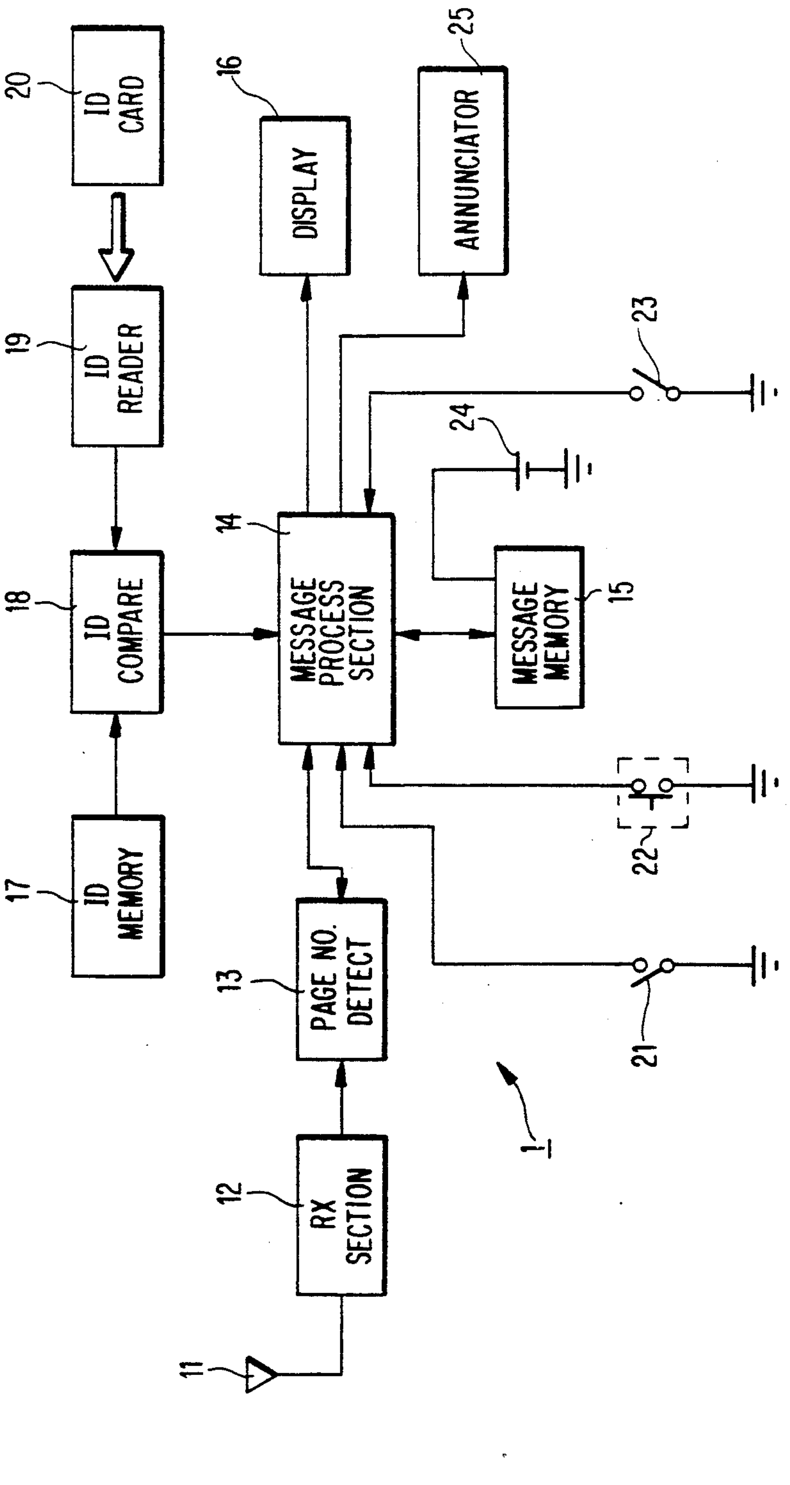
FIG. 1 is a block diagram showing a paging receiver embodying the present invention.

In FIG. 1, a paging receiver 1 includes an antenna 11 picking up a radio paging signal which contains a paging number and a message following the paging number. The antenna 11 supplies the received signal to a radio section 12 which demodulates the received signal to produce a demodulated paging number and message. A paging signal detector 13 compares the demodulated paging number and a paging number stored therein. If they coincide with each other, the detector 13 produces a paging number coincidence signal and supplies it and the demodulated message to a message process section 14.

Upon the coincidence signal, the message process section 14 drives an annunciator 25 to output an alert signal in a normal mode. The section 14 stores the message into a message memory 15 powered by a back-up battery 24 to maintain messages therein. In the normal mode, the section 14 displays the received or stored message on a display unit 16. In a memory, or silent, mode, neither the alert signal nor the message display is provided.

The normal mode is changed to the memory mode and vice versa by depressing a mode setting switch 23. A message read-out switch 22 is connected to the message process section 14 to read a message out of the message memory 15 and display the read-out message on the display unit 16. A power switch 21 is provided for controlling power supply from a main battery (not shown) to the paging receiver 1.

The above-mentioned paging operation is well known in the art and therefore no further description will be provided in this specification.

An identification (ID) memory 17 stores an ID number assigned to the paging receiver 1. An ID comparator 18 compares the stored ID number with an ID number which is read from an ID card 20 using an ID reader 19. If the comparator 18 finds them coincident, it provides a high level signal as an ID coincidence signal to the message process section 14. If not finding coincident, the comparator 18 provides a low level signal as a non-ID coincidence signal to the section 14. Under the condition that the ID coincidence signal is provided and the mode is set to the normal mode, the message process section 14 displays a received or stored message on the display unit 16 in response to the reception of the message or to the depression of message read-out switch 22. If the non-ID coincidence signal is provided, the section 14 prevents the display unit 16 from displaying a received or stored message thereon.

Figure 2:
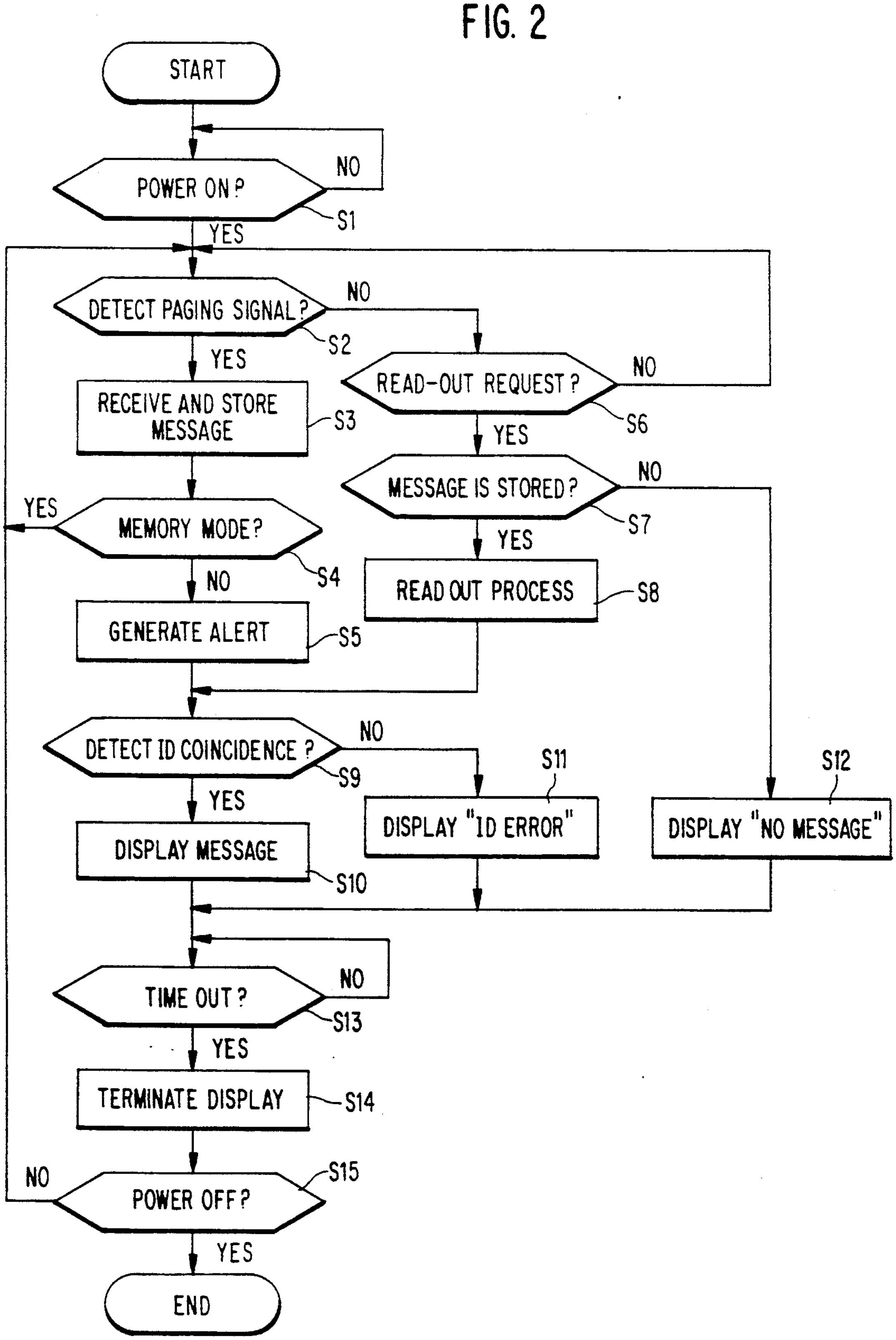
FIG. 2 is a flow chart illustrating the operation of the receiver shown in FIG. 1.

Referring to FIG. 2, the message display operation according to the present invention will now be described in more detail. The message process section 14 checks at step S1 if the power switch 21 is turned on or off. If the switch 21 is turned on, the section 14 sees at step S2 if it receives the paging number coincidence signal indicating that the received paging number is identical with the stored paging number. Upon reception of the paging number coincidence signal, the section 14 receives a message following the paging number and stores it into the message memory 15 at step S3. Then, if the pager 1 is not set to the memory mode at step S4, an alert signal is generated at step S5 to inform the user of being paged. If the memory mode is set, steps S2 to S4 are repeated.

Returning to step S2, when no paging number coincidence signal is received, the section 14 checks at step S6 if the message read-out switch 22 is depressed. If not, the operation returns to step S2. If yes, the operation proceeds to step S7 to see whether or not messages are stored in the message memory 15. If no message is stored, the section 14 causes the display 16 to display "NO MESSAGE" thereon. If at least one message is stored, step S7 is followed by step S8 at which the section 14 carries out a read-out process, i.e., it reads a message out of the message memory 15 and temporarily registers it into a register therein.

Steps S5 and S8 are followed by step S9 to check whether the ID coincidence signal from the ID comparator 18 is a high or low level. If it is a high level, i.e.. the coincidence exists, the read-out message is displayed on the display unit 16 at step S10. If it is a low level. i.e.. no coincidence exists the received or stored message is prevented from being displayed on the display unit 16. Instead, "ID ERROR" appears on the display unit 16 at step S11.

All steps S10–S12 are followed by step S13 at which it is checked whether a predetermined period of time elapses. Upon elapse of the predetermined period of time, display information, namely, the received or stored message, "ID ERROR" or "NO MESSAGE" is erased from the display unit 16 at step S14. Thereafter, if power is continued to be supplied to the paging receiver 1 at step S15, the operation returns to step S2.

Figure 3:
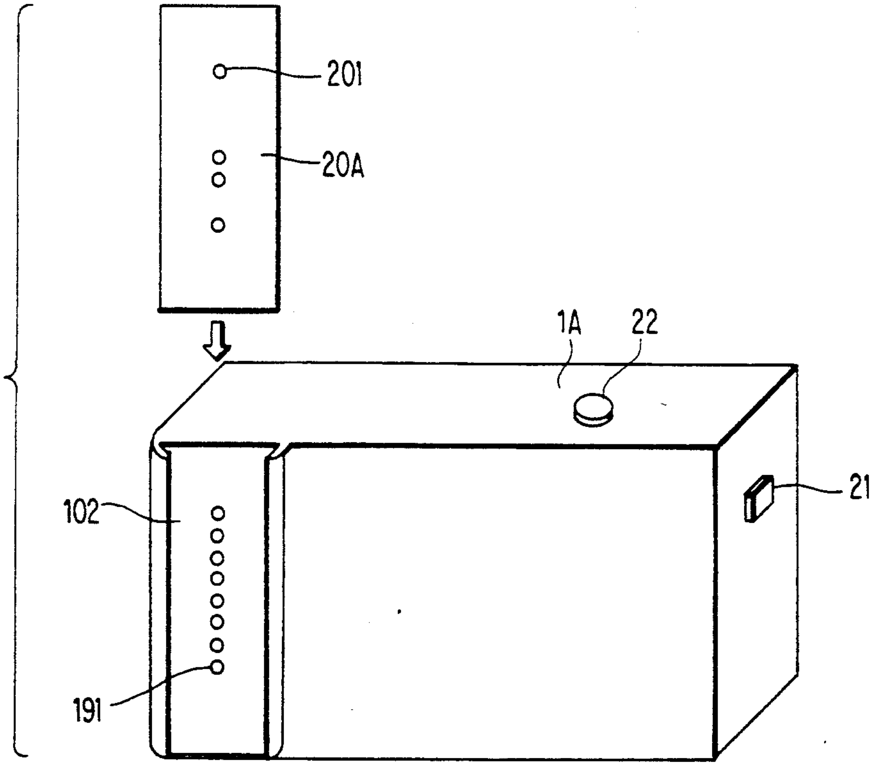
FIG. 3 is a perspective view of the paging receiver shown in FIG. 1.

FIG. 3 shows a perspective view of an ID card and a paging receiver casing which accommodates the circuitry of the FIG. 1 receiver. The power switch 21 is mounted on the side wall of the casing IA. The message read-out switch 22 is mounted on the top of casing IA. On the back side of casing 1A is provided a recess 102 into which an ID card 20A is to be inserted. The card 20A includes coded holes 201 representative of a coded ID number. The recess 102 comprises through-holes 191 through which the coded ID number on ID card 20A is read out. The through-holes 191 are aligned with the coded holes 201 of ID card 20A.

Figure 4:
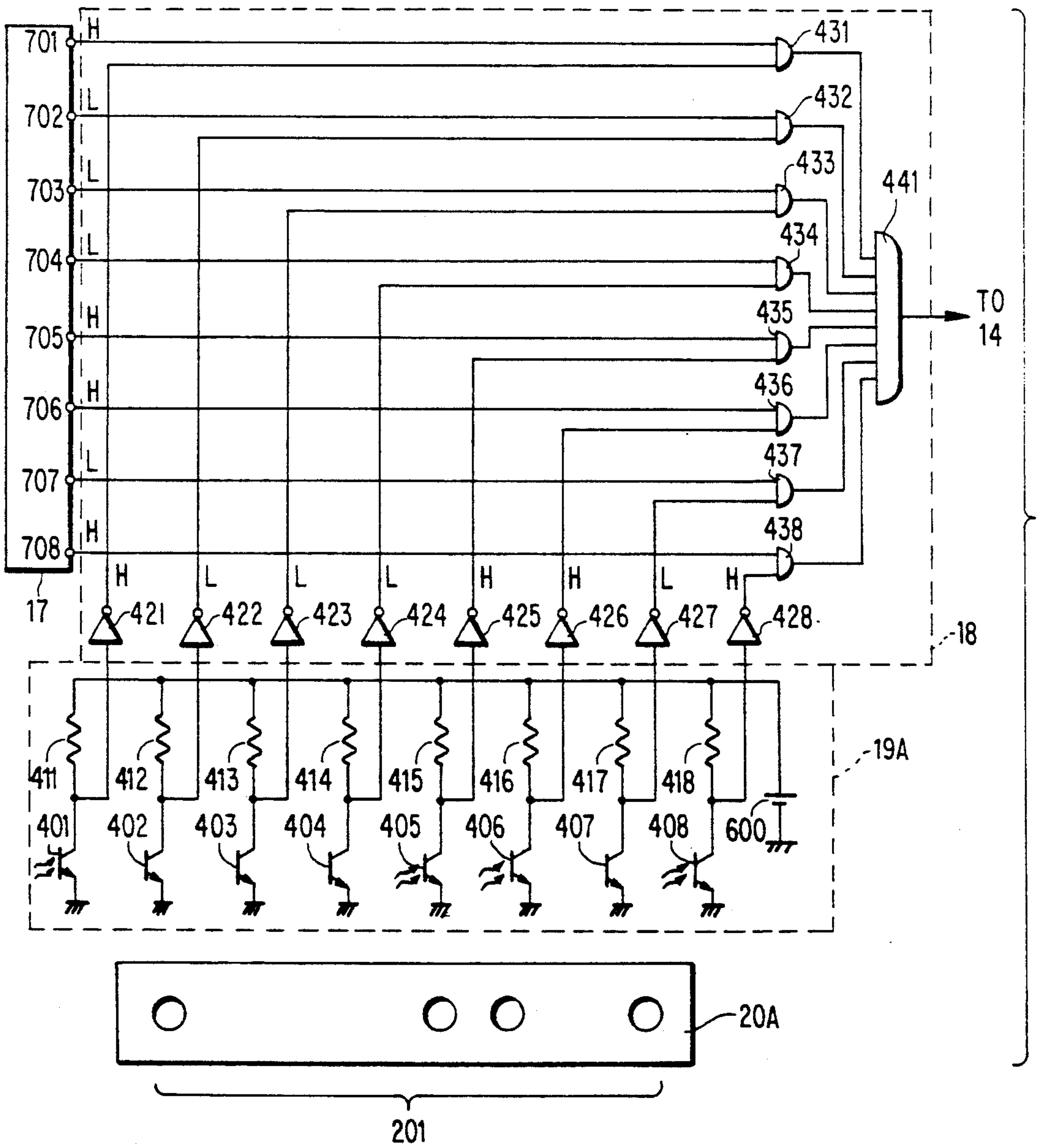
FIG. 4 shows a schematic circuit diagram of the ID reader and ID comparator within the receiver shown in FIGS. 1 and 3.

In FIG. 4, the ID card 20A has the coded holes 201 representing a coded ID number of "HLLLHHLH." An ID reader 19A comprises phototransistors 401–408 whose emitters are grounded and whose collectors are respectively connected with one ends of resistors 411–418. The collectors are also connected with the inputs of invertors 421–428 of ID comparator 18, respectively. The other ends of resistors 411–418 are connected with a battery 600.

In the ID comparator 18, the outputs of invertors 421–428 are connected with one inputs of two-input AND gates 431–438, respectively. The other inputs of AND gates 431–438 are connected with output terminals 701–708 of the ID memory 17, respectively. In this instance the output levels of ID memory 17 are set to "HLLLHHLH" representing an ID number assigned to the receiver. The outputs of AND gates 431–438 are provided to a multi-input AND gate 441 whose output is applied to the message process section 14.

When the ID card 20A is inserted into the recess 102 of paging casing IA (FIG. 3), only phototransistors 401. 405 and 408 are rendered conductive and thus the outputs of invertors 421, 425 and 428 become a high level "H." The output of the other invertors 422–424 and 427 remain at low level "L." All the AND gates 431–438. therefore, provide a high level "H" to AND gates 441 which in turn produces a high level signal indicating an ID coincidence and supplies it to the message process section 14.

If another ID card having coded holes different from those of the ID card 20A is inserted into the recess 102, AND gate 441 produces a low level signal indicating that no ID coincidence exists and thus the inserted card is unauthorized.

Figure 5:
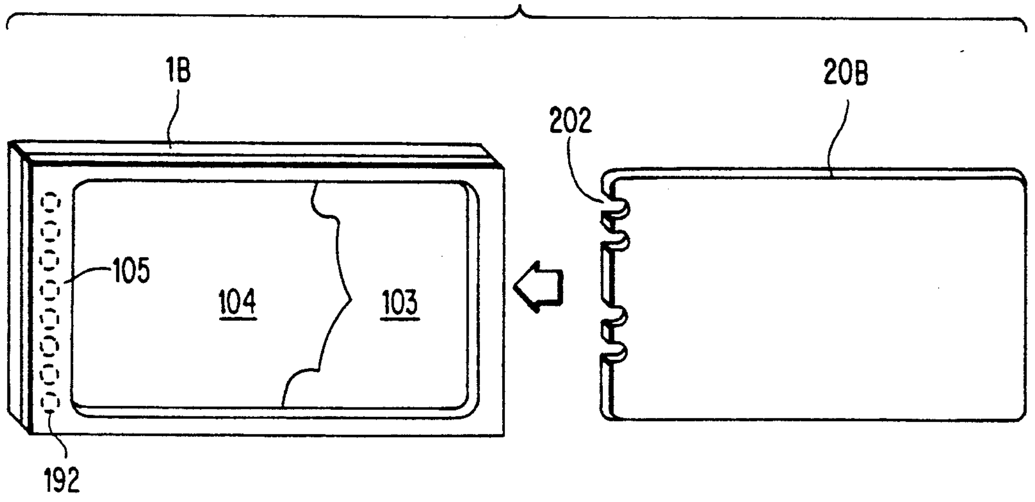
FIG. 5 is another perspective view of the paging receive shown in FIG. 1.

In FIG. 5, a receiver casing 1B comprises a recess 104 on its back side ,and grooves 103 and 105. A bank of mechanical switches 192, shown in broken lines, are provided in the groove 105. An ID card 20B includes a combination of coded recesses 202 and edges, which combination represents an ID number. The card 20B is to be slided into the grooves. The edges and recesses 202 turn on and off the switches 192, respectively.

Figure 6:
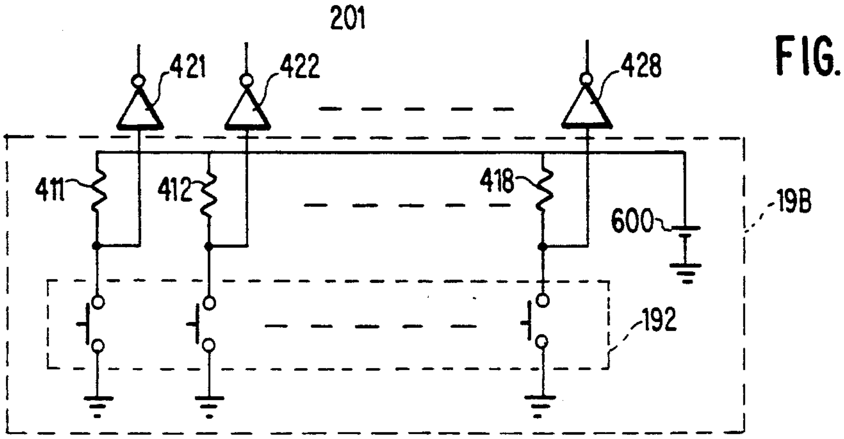
FIG. 6 shows a schematic circuit diagram of the ID reader within the receiver shown in FIGS. 1 and 5.

In FIG. 6, the switches 192 are connected between the inputs of invertors 421–428 and ground, respectively. Although the phototransistors 401–408 are replaced by the switches 192 the operation of FIG. 6 circuit is the same as that of the FIG. 4 circuit.

In summary, the paging receiver according to the present invention prevents the received or stored message from being displayed if there is no coincidence between ID numbers stored in the receiver and in the ID card. Thus, unauthorized access to the message can be prevented.

What is claimed is:

1. A paging receiver comprising:
first storing means for storing a paging number;
means for receiving a paging number followed by a message;
first comparing means for comparing the stored paging number and received paging number and producing a coincidence signal when they are identical;
means responsive to said coincidence signal for receiving said message;
means for displaying the received message;
second storing means for storing a first identification number;
third storing means for storing a second identification number;
means for reading said second identification number out of said third storing means;
means for comparing said first identification number and the read-out second identification number; and
means for preventing said displaying means from displaying said message if said first and second identification numbers are not identical.

2. A paging receiver as claimed in claim 1, further comprising means responsive to said coincidence signal for generating an alert signal.

3. A paging receiver as claimed in claim 1, further comprising fourth storing means for storing said received message, said fourth storing means being powered by a back-up battery.

4. A paging receiver as claimed in claim 3, further comprising means for generating a message read-out signal; means responsive to said message read-out signal for reading the stored message out of said fourth storing means; and means for displaying the read-out message.

5. A paging receiver comprising:
power switch means for turning on and off said receiver;
receiver means for receiving and demodulating a paging signal including a paging number and a message following said paging number to produce a demodulated paging number and message;
paging number storing means for storing a paging number;
paging number detector means for comparing said demodulated paging number with the stored paging number and producing a coincidence signal when they are identical with each other;
message memory means responsive to said coincidence signal for storing said demodulated message:

back-up battery means for supplying power to said message memory means irrespective of the condition of said power switch means;

ID memory means for storing a first ID number;

ID card means for storing a second ID number;

ID reader means for reading said second ID number from said ID card means:

ID comparator means for comparing said first ID number and said second ID number and producing a non-coincidence signal if they are not coincident with each other;

display means for displaying the demodulated or stored message thereon; and means responsive to said non-coincidence signal for preventing said display means from displaying said message thereon.

6. A paging receiver as claimed in claim 5, further comprising means for generating an alert signal in response to said coincidence signal.

7. A paging receiver as claimed in claim 5, further comprising means for manually generating a message read-out signal and means responsive to said message read-out signal for reading said message out of said message memory means and supplying the read-out to said display means.

8. A receiver comprising:

paging number memory means for storing a paging number;

means for receiving a paging number followed by a message;

paging number comparator means for comparing the stored paging number and received paging number and producing a coincidence signal when they are identical;

means responsive to said coincidence signal for receiving said message;

display mans for displaying the received message;

ID memory means for storing a first ID number;

ID card means for storing a second ID number;

ID reader means for reading said second ID number from said ID card;

ID comparator means for comparing said first ID and read-out ID numbers and producing a non-coincidence signal when said ID numbers are not identical with each other; and means responsive to said non-coincidence signal for preventing said display means from displaying said message.

9. A receiver as claimed in claim 8, wherein said receiver further comprises casing means for accommodating said receiver therein, said casing means comprising a plurality of through-holes, and wherein said ID card means comprises coded holes representative of said second ID number, said coded holes being aligned with said through-holes.

10. A receiver as claimed in claim 9, wherein said ID reader means comprises a plurality of phototransistors which are aligned with said through-holes respectively, and whose emitters are grounded; a plurality of resistors connected between a battery and the collectors of said phototransistors, respectively: and wherein said ID memory means comprises a plurality of output terminals whose levels represent said first ID number, and wherein said ID comparator means comprises a plurality of invertors whose inputs are connected with the collectors of said phototransistors, respectively; a plurality of two-input AND gates one inputs of which are connected with the outputs of said invertors, respectively, and the other inputs of which are connected with the output terminals of said ID memory means, respectively; and multi-input AND gate means whose inputs are connected with the outputs of said two-input AND gates, respectively, for producing said non-coincidence signal when the inputs to said multi-input AND gate means are not all coincident.

11. A receiver as claimed in claim 8, wherein said receiver further comprises casing means for accommodating the circuitry of said receiver therein, and wherein said ID card means comprises a combination of edges and recesses, said combination representing said second ID number.

12. A receiver as claimed in claim 11, wherein said ID reader means comprises; a plurality of switches which are aligned with said combination, one ends of said switches being grounded, a plurality of resistors connected between a battery and the other ends of said switches, respectively, and wherein said ID memory means comprises a plurality of output terminals whose levels represent said first ID number, and wherein said ID comparator means comprises a plurality of invertors whose inputs are connected with the other ends of said switches, respectively: a plurality of two-input AND gates one inputs of which are connected with the outputs of said invertors, respectively, and the other inputs of which are connected with the output terminals of said ID memory means, respectively; and multi-input AND gate means whose inputs are connected with the outputs of said two-input AND gates, respectively, for producing said non-coincidence signal when the inputs to said AND gate means are not all coincident.

13. A receiver as claimed in claim 12, wherein each of said switches comprises a mechanical switch.

14. A radio paging receiver having a display function, comprising:

receiving means for receiving a first signal indicative of a paging number and a subsequent message information signal;

first detection means for detecting said first signal among outputs of said receiving means with its own paging number and outputting a first coincidence detection signal when a coincidence therebetween is detected;

first means responsive to said coincidence detection signal for receiving and processing said message information signal and for memorizing or displaying said message information signal;

second detection means for detecting an ID number coded on an ID card with its own ID number and outputting a non-coincidence detection signal when these ID numbers are not coincident; and second means responsive to said non-coincidence detection signal for prohibiting said display.

15. A paging receiver comprising:

means for detecting a paging number meant for said receiver;

message memory means for storing a message following said paging number;

means for generating a message read-out signal;

means responsive to said message read-out signal for checking if a message is stored in said message memory;

means for displaying a first pattern if no message is stored in said message memory;

means for reading a message out of said message memory if a message is stored in said message memory;

ID source means for producing an ID number assigned to said receiver;

mean responsive to the output of said ID source means for detecting said ID number:

means for displaying a second pattern in response to no detection of said ID number; and means for displaying the read-out message in response to the detection of said ID number.

16. A receiver as claimed in claim 15, further comprising:

means for generating an alert signal in response to the detection of said paging number; and means for terminating the display of said first pattern, second pattern or read-out message in response to the elapse of a predetermined period of time.

17. A receiver as claimed in claim 15, wherein said first pattern includes NO MESSAGE and wherein said second pattern includes ID ERROR.

18. A method of controlling display of a paging receiver, comprising the following steps of:

storing a paging number;

receiving a paging number followed by a message;

comparing the stored paging number and the received paging number and producing a coincidence signal when they are identical;

responsive to said coincidence signal, receiving said message;

displaying the received message;

storing a first identification number;

storing a second identification number;

reading out the stored second identification number;

comparing said first identification number and said read-out second identification number; and preventing said step of displaying the received message if said first and second identification numbers are not identical.

19. A method as claimed in claim 18, further comprising the step of:

responsive to said coincidence signal, generating an alert signal.

20. A method as claimed in claim 18, further comprising the step of storing said received message in a message memory powered by a back-up battery.

21. A method as claimed in claim 20, further comprising the steps of: generating a message read-out signal: responsive to said message read-out signal, reading out the stored message: and displaying the read-out message.

22. A method of controlling display of a paging receiver, comprising the following steps of:

detecting a paging number meant for said receiver;

storing a message following said paging number;

generating a message read-out signal;

responsive to said message read-out signal checking if a message is stored;

reading out the stored message if a message is stored;

detecting an ID number assigned to said receiver;

displaying the read-out message in response to the detection of said ID number; and prohibiting the display of the read-out message in response to no detection of said ID number.

23. A method as claimed in claim 22, further comprising the steps of displaying a first pattern if a message is stored and displaying a second pattern in response to no detection of said ID number.

24. A method as claimed in claim 22, further comprising the steps of;

generating an alert signal in response to the detection of said paging number; and terminating the display of said read-out message in response to the elapse of a predetermined period of time.

25. A receiver comprising:

means for storing a paging number;

means for receiving a paging number followed by a message;

means for comparing the stored and received paging numbers and producing a coincidence signal when they are identical;

means responsive to said coincidence signal for receiving said message;

means for storing the received message;

display means for displaying the stored message;

ID source means for producing an ID number assigned to said receiver;

means responsive to the output of said ID source means for detecting said ID number; and means responsive to no detection of said ID number for prohibiting said display means from displaying the stored message.

26. A receiver as claimed in claim 25, wherein said ID source means comprises:

ID memory means for storing said ID number; and wherein said detecting means comprises:

ID card means for storing an ID member;

means for reading said ID number from said ID memory and card means; and means for comparing the read ID number with each other and supplying the comparison resultant to said prohibiting means.

* * * * *

UNITED STATES PATENT AND TRADEMARK OFFICE

CERTIFICATE OF CORRECTION

PATENT NO. : 5,151,694

DATED : September 29, 1992

INVENTOR(S) : Koji YAMASAKI

It is certified that error appears in the above-indentified patent and that said Letters Patent is hereby corrected as shown below:

ON THE TITLE PAGE:

In the "[30] Foreign Application Priority Data" replace "United Kingdom" with --Japanese Patent Application--.

Col. 8, line 45, delete "member" and insert --number--.

Signed and Sealed this

Second Day of November, 1993

Attest:

Bruce Lehman

BRUCE LEHMAN

*Attesting Officer* *Commissioner of Patents and Trademarks*